UNITED STATES PATENT OFFICE.

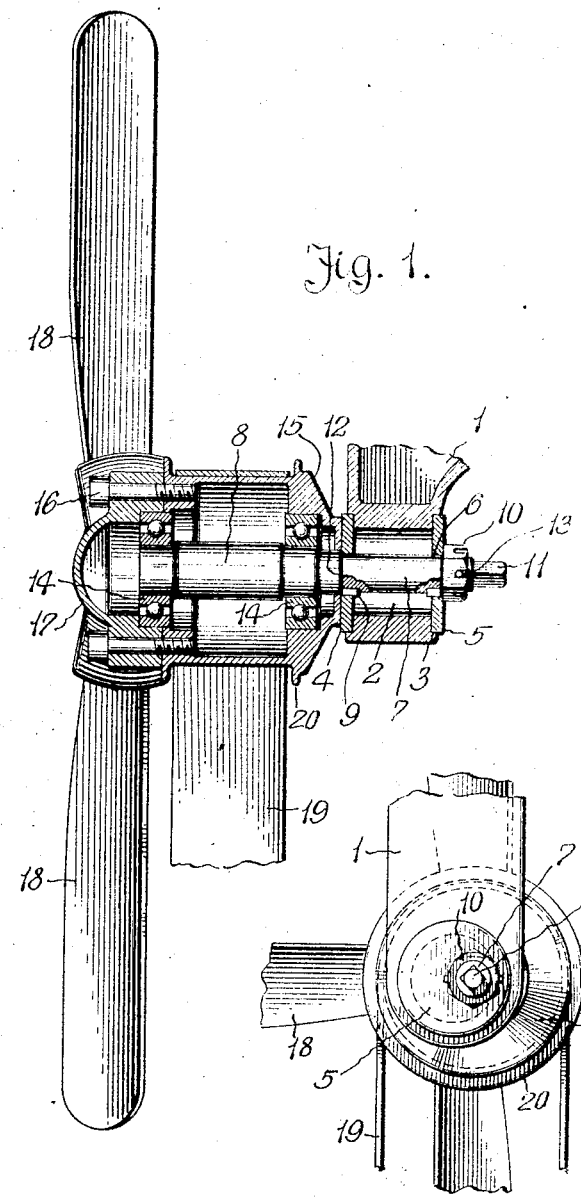

HENRY FORD, OF DETROIT, MICHIGAN.

BELT-ADJUSTING MEANS.

1,393,990.  Specification of Letters Patent.  Patented Oct. 18, 1921.

Application filed April 15, 1918. Serial No. 228,591.

*To all whom it may concern:*

Be it known that I, HENRY FORD, a citizen of the United States of America, residing at Detroit, in the county of Wayne and State of Michigan, have invented certain new and useful Improvements in Belt - Adjusting Means, of which the following is a specification, reference being had therein to the accompanying drawings.

This invention relates to belt tightening means wherein the fan or body driven by the belt is bodily adjusted to take up slack in the belt and insure proper driving relation between the belt and the body driven thereby.

The belt tightening means is associated with a novel fan construction and arbor or shaft therefor, and includes eccentric means that may be easily and quickly adjusted without disassembling the fan or its bearing.

My invention will be hereinafter more fully referred to and reference will now be had to the drawing, wherein—

Figure 1 is a longitudinal sectional view of the fan construction and its adjustable bearing, and Fig. 2 is a rear elevation of the same.

In the drawing, the reference numeral 1 denotes a bracket or bearing having an opening 2 and at the ends of said opening are annular seats 3 for eccentric washers 4 and 5. These washers are concentric relative to the opening 2 but have eccentric alining openings 6 for the inner reduced end 7 of a fan shaft 8. The inner end 7 of the fan shaft is fixed relative to the eccentric washers 4 and 5 by keys 9 or other fastening means and the inner end of said shaft has a threaded portion for a nut 10 and a rectangular portion or shank 11 adapted to receive a wrench. The nut 10 abuts the eccentric washer 5 and the eccentric washer 4 abuts a stepped portion or annular shoulder 12 intermediate the ends of the fan shaft. It is therefore possible to tighten the nut 10 so as to fix the eccentric washers 4 and 5 relative to the bracket 1 and to prevent the nut from becoming accidentally loose or displaced, a cotter pin 13 may be placed in engagement with the nut 10.

The fan shaft 8 has additionally stepped or reduced portions affording annular shoulders for anti-frictional bearings 14 of a conventional form and these bearings support a pulley or wheel 15 to the outer face of which is connected, by screw bolts 16 or other fastening means a central portion or hollow hub 17 of a fan 18. The hollow hub 17 provides clearance for the outer end of the fan shaft 8 and the bearing 14 thereon, and a belt or other flexible member 19 is trained over a pulley or wheel 15 for imparting movement thereto. The belt or pulley 19 is preferably of that type having peripheral flanges 20 adapted to prevent the belt or flexible member 19 from becoming accidentally displaced and the inner end or face of the pulley or wheel 15 is closed by a portion 21 extending between the inner bearing 14 and the eccentric washer 4, this portion of the pulley or wheel excluding dust and dirt and coöperating with the hollow hub 17 of the fan 18 in providing an inclosure in which a suitable lubricant may be placed to insure easy running of the outer race members of the anti-frictional bearings relatively to the inner race members thereof.

As shown in the drawings, the fan shaft 8 is between two extreme positions of adjustment, one representing maximum tightness and the other minimum looseness of the belt 19 of the pulley 15, and to adjust the inner end of the fan shaft 8, the cotter pin 13 is removed from the nut; the nut loosened and a wrench placed on the shank or square end 11 of the shaft and turned until the belt is sufficiently tight. The turning of the fan necessarily shifts the eccentric washers 4 and 5 on the seats 3 of the bracket 1 and after the belt is sufficiently taut, the fan shaft is still held by the wrench and another wrench employed to tighten the nut 10, thereby fixing the washers 4 and 5 relative to the bracket 1. The cotter pin 13 can then be replaced.

The construction above referred to has been especially designed for the fan and belt of a well known type of tractor or automobile, the fan being associated with a radiator as a cooling or air circulating medium, and the belt driven from the engine shaft of the tractor or automobile. The invention however, is not necessarily limited to this specific use, and while in the drawing there is illustrated one embodiment of my invention which I have found practicable and placed in use, yet it is to be understood that I may change the structural elements without departing from the scope of the appended claims.

What I claim is:—

1. The combination with a bracket, a stepped fan shaft extending therethrough, a pulley rotatable on the shaft and provided with a fan and a belt for imparting movement thereto, of tightening means comprising eccentric washers set in said bracket with one of said washers between a stepped portion of said shaft and the bracket and adapted for adjusting said fan shaft relative thereto, and means adapted to move said shaft and said eccentric washers so that said washers are bound against said bracket.

2. The combination with a bracket and a stepped shaft extending therethrough, of tightening means comprising eccentric washers set in said bracket with one of said washers between a stepped portion of said shaft and the bracket and adapted for adjusting said shaft relative thereto, and means adapted to move said shaft and said eccentric washers so that said washers are bound against said bracket.

In testimony whereof I affix my signature in the presence of two witnesses.

HENRY FORD.

Witnesses:
ROBERT E. WALTER,
E. G. SIEBOLD.